US005154392A

United States Patent [19]

Voight

[11] Patent Number: 5,154,392

[45] Date of Patent: Oct. 13, 1992

[54] THREE-WAY PROMOTIONAL DISPLAY

[75] Inventor: John K. Voight, Lexington, Ky.

[73] Assignee: Ashland Oil, Inc., Ashland, Ky.

[21] Appl. No.: 650,505

[22] Filed: Feb. 5, 1991

[51] Int. Cl.[5] ............................................ F16M 13/00

[52] U.S. Cl. ...................................... 248/558; 40/539; 40/610; 248/174; 248/459; 248/519

[58] Field of Search ............... 248/459, 174, 467, 519, 248/558; 40/539, 610

[56] References Cited

U.S. PATENT DOCUMENTS

| | | | |
|---|---|---|---|
| 1,439,719 | 12/1922 | Whipple | 248/459 |
| 2,099,192 | 11/1937 | Brant | 248/459 |
| 2,116,647 | 5/1938 | Snelling | 248/174 |
| 2,788,596 | 4/1957 | Schwartz | 248/459 X |
| 2,882,629 | 4/1959 | Moebius | 40/610 X |
| 3,169,740 | 2/1965 | Beckett | 248/174 X |
| 3,176,419 | 4/1965 | Stein | 40/610 |
| 3,178,138 | 4/1965 | Hessdoerfer | 248/467 X |
| 3,350,804 | 11/1967 | Guyer, Jr. et al. | 40/610 X |
| 3,459,928 | 1/1949 | Edwards | 40/610 |
| 4,171,790 | 10/1979 | Crescenti | 248/459 X |

*Primary Examiner*—David L. Talbott
*Attorney, Agent, or Firm*—Richard C. Willson, Jr.

[57] ABSTRACT

Promotional card with easel and standard-holder on reverse. The display unit can be used as a header assembly with a standard (or pre-scored piece of corrugated material) or as a counter-card by folding out the easel wings and locking them into place with the included lock, or as a frame-card in a frame-card holder. The pre-scored piece of corrugated material serves as a standard, but can be folded lengthwise to reduce its length for convenient mailing.

11 Claims, 3 Drawing Sheets

THREE-WAY PROMOTIONAL DISPLAY

BACKGROUND OF THE INVENTION

I. Field of the Invention

The present invention relates to the general field of display devices, particularly those having easels, generally classified in U.S. Patent Class/subclasses: 40/124.1; 206/44+; 206/45.21; 206/45.25; 206/45.26; 206/45.27; 211/40; 248/174; 248/459; 248/460; 248/463; 248/465; 248/472.

II. Description of the Prior Art

U.S. Pat. No. 4,311,233 to Austin (assigned Champion International), Class 206/45.25, teaches an easel-type display package for holding a number of individually packaged products inside a rear wall and side walls.

U.S. Pat. No. 4,291,798 to Transport, Class 206/45.24, teaches a display device having a collapsible easel support comprising a back panel with a stay flap.

U.S. Pat. No. 4,207,694 to Dickey, Class 40/158, teaches a one-piece frame with a standing/hanging back triangular easel.

U.S. Pat. No. 4,780,975 for Friedman, Class 40/152.1, teaches a combined mailer and easel-type display frame formed from a planer blank with a picture-receiving display pocket.

U.S. Pat. No. 4,582,286 to Mancuso, Class 248/459, also shows a planer easel display having an erectable easel section.

None of the above understood to teach a combination easel/standard-holder which is a preferred feature of the present invention.

Other easel-display patents include U.S. Pat. Nos. 4,893,711; 4,825,574; 4,817,905; 4,694,955; 4,515,338; 4,476,986; 4,330,951; 4,290,216; 4,182,0961; 4,171,116; 4,077,512; 4,062,138; 4,032,014; and 3,908,955.

SUMMARY OF THE INVENTION

I. General Statement of the Invention

The present invention comprises a promotional card with easel and standard-holder on its reverse. This display unit can be used as a header assembly with a standard (post) or preferably a pre-scored piece of corrugated material which can be folded for mailing and folded into a standard upon receipt, or as a counter-card by folding out the easel wings and locking them into place with the included lock, or as a frame-card in a frame-card holder. The pre-scored piece of corrugated material serves as a standard, but can be folded lengthwise to reduce its length for convenient mailing.

In preferred embodiments, the easel can be a double easel with two wings folding out for improved stability, as in the device shown in FIG. 1. The base for the standard shown in FIG. 3 can be a mounting device as shown in FIG. 2 with two fold-outs adapted to receive the standard shown in FIG. 3, and with additional appendages to attach to a container or other supporting base, e.g. a bottle for motor oil.

Alternatively, the standard which is preferably three-sided for economy and stability, can be stabbed between packages in a carton, e.g. between motor oil bottles of the type shown in FIG. 4 which are packed standing vertically in a carton of 12 or 24. This provides product display, a supply of product, and the point-of-purchase display all compactly together in a single self-promoting retain inventory unit.

The invention will generally be made of corrugated cardboard, though fiber board, plastic, and even metal may be adapted for some portions of the display if needed. Fabrication will be well understood by the those skilled in the art of point-of-purchase advertisement production.

II. Utility of the Invention

The invention is readily mailable, compact, inexpensive (because it is made of flat materials which can be readily fabricated on a conventional printer-slotter), and is adaptable to be used as a display in three different modes which can be chosen by the retailer who receives the mailing.

DESCRIPTION OF THE PREFERRED EMBODIMENTS

Figure 1:
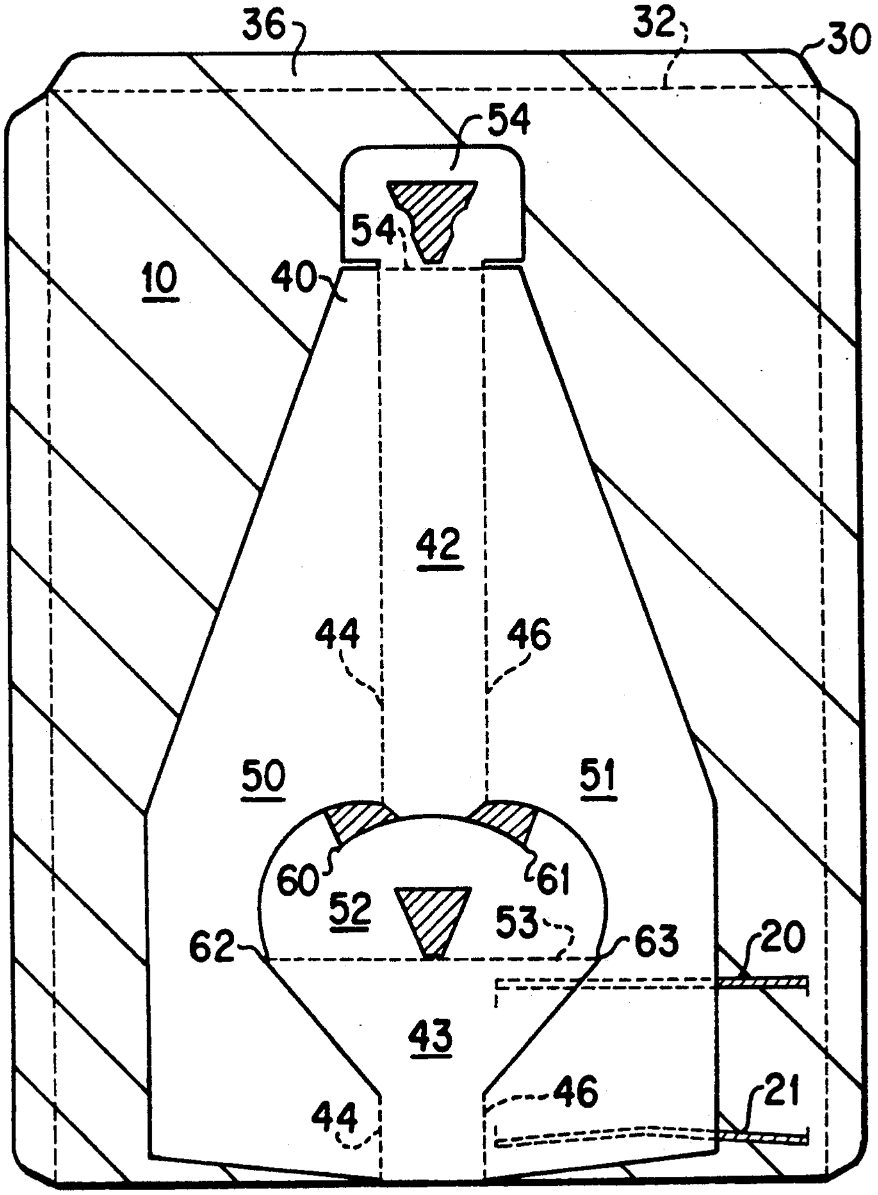
FIG. 1 is a schematic of the main planar element of the invention (shown hatched) with easel elements attached.

FIG. 1 depicts a plan view of the main planar element of the invention. The display sheet 10 is shown with crosshatching for clarity and includes slots 20 and 21 for holding a pad of coupons or order blanks (now shown) and roundings 30 which interact with scoring 32 to permit edge portions 36 to be folded up at right angles to the main sheet 10.

Support sheet 40 has a center panel 42 defined by longitudinal scores 44 and 46, locking fold-out 52 and top fold-out 54. Center portions 42 and 43 are glued to main sheet 10 with suitable adhesive, but fold-outs 52 and 54 and easel portions 50 and 51 of the support sheet 40 are all unglued and are free to fold out at 90 degrees to the main sheet 10. Cut-out portions of fold-outs 52 and 54 are shown with close crosshatching.

In operation in the easel mode, easel portions 50 and 51 are first swung out at right angles to the main sheet 10, then fold-out 52 is swung down and out at right angle to main sheet 10, so detents 60 and 61 engage detents 62 and 63 respectively, of easel portions 50 and 51, locking them at right angles to main sheet 10, and permitting the assembly to stand up and display the reverse fact of main sheet 10 which is imprinted with suitable point of purchase advertising material.

Alternately, elements 10 and 40 can remain flat and can be inserted into a permanent display frame.

Figure 2:
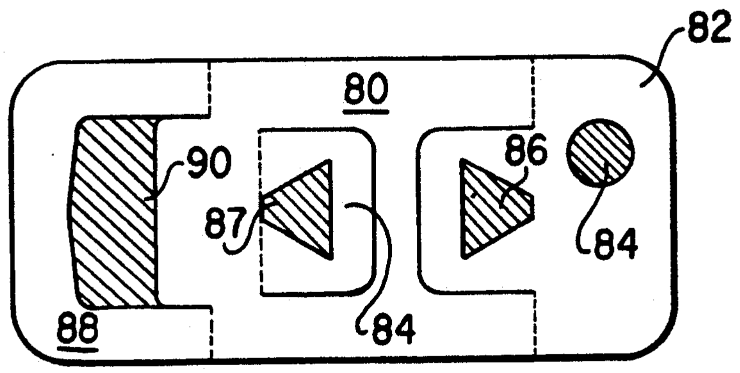
FIG. 2 is a schematic of a standard-holder.
Figure 3:
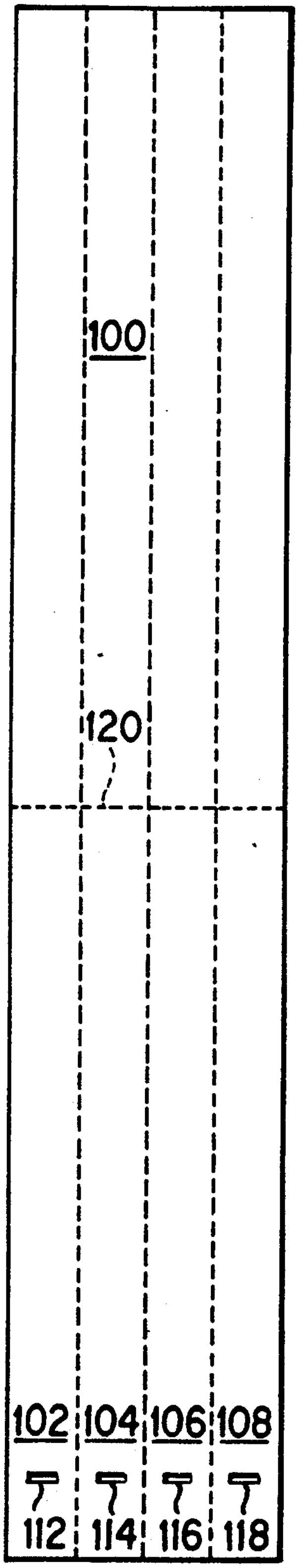
FIG. 3 is a schematic of a foldable standard for engaging elements 43 and 53 of FIG. 1.

FIG. 2 depicts the standard-holder and FIG. 3 depicts the standard of the invention, both useable in a display standard mode of employing the invention.

Figure 4:
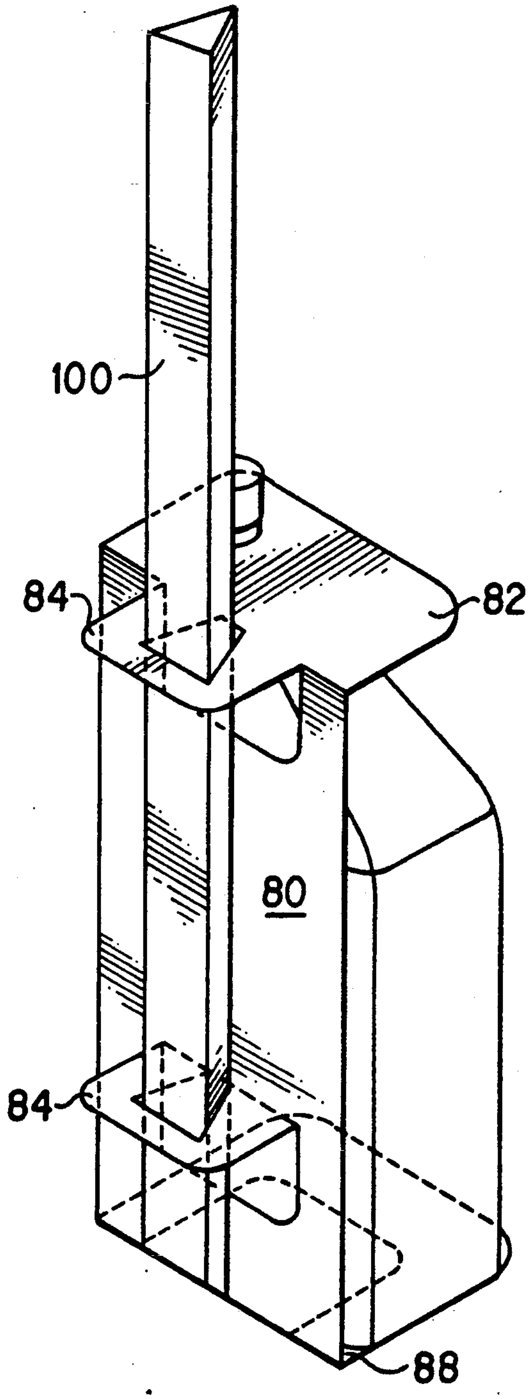
FIG. 4 shows the standard of FIG. 3 assembled into the standard-holder of FIG. 2 which is attached over a conventional product container.

FIG. 2 shows the standard-holder used to hold erect the standard (post) shown in FIG. 3. Standard 80 is cut from corrugated cardboard or fiber board. Cap collar 82 has a cut-out 84 adapted for engaging the neck or cap of a container such as the motor oil bottle shown in FIG. 4. Cap collar portion 82 has a second cut-out 86 adapted to receive the triangular standard 100 shown in FIG. 3. Alternatively, standard cut-out 87 can be included into a separate fold-out at a lower elevation than cut-out 84. Cap collar portion 82 is adapted to fold along fold lines (shown dotted) to approximately right angles with the main body of the standard-holder 80. A second stabilizing triangular hole 86 for holding the standard 100 at a different elevation point is provided on fold-out tab 84, also adapted to be folded out from the main body of the standard-holder 80 at approximately right angles. Another fold-out tab 88 is adapted to be folded inward so as to form a "C" shape with cap collar portion 82 as shown in FIG. 4. An optional cut-out 90 can provide lightness and may engage extensions on the bottom of the motor oil bottle or other container.

FIG. 3 shows the standard (post) element of the invention which is used in the display mode which consists of three vertical portions divided by fold lines (shown dotted), 102, 104, 106, and 108, each having cut-out slots 112, 114, 116, and 118, respectively. These cut-out slots can be at the top of the standard so as to engage the slight tabs shown in the cut-out in fold-out 54 of the display. To simplify mailing, the standard 100 can be folded at horizontal fold line 120 (shown dotted) and additional fold lines can be provided to reduce the length of standard 100 to convenient mailing size.

FIG. 4 shows the standard-holder 80 and the standard 100 assembled and mated with a product container, a motor oil bottle in which the collar cut-out 84 can be slipped over the top of the bottle, and the standard 100 inserted into cut-outs 86 and 87. As mentioned above, the standard-holder 80 can be discarded and the standard, instead, alternatively stabbed between the individual containers in a packed carton of product after the top of the carton has been opened or removed, or among the packed containers in an open-top tray, commonly used in a packaging of motor oils.

Figure 7:
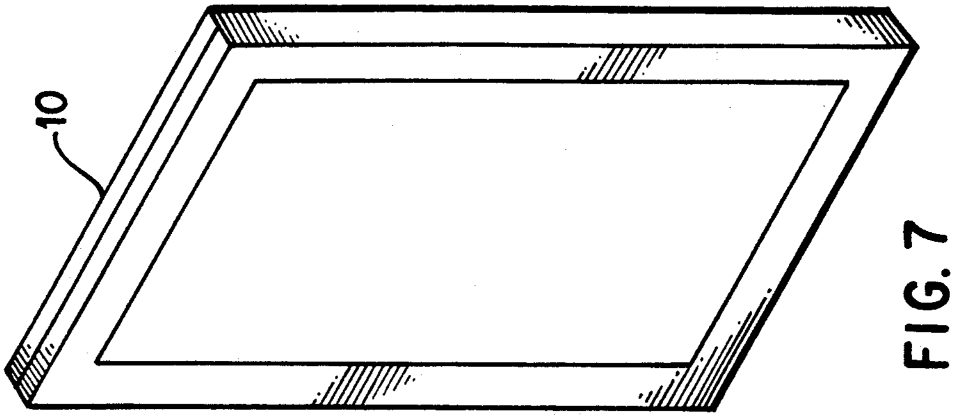
FIG. 7 shows the device being slid into a common frame for display.
Figure 6:
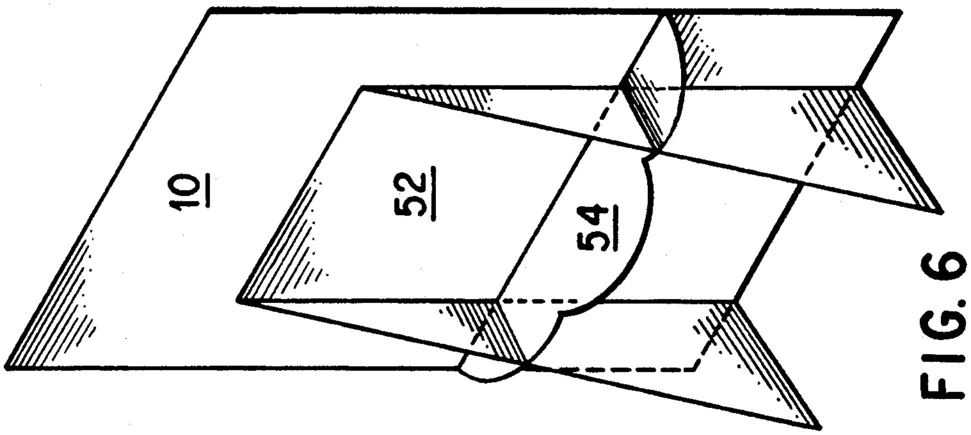
FIG. 6 shows the device assembled with easel on a countertop.
Figure 5:
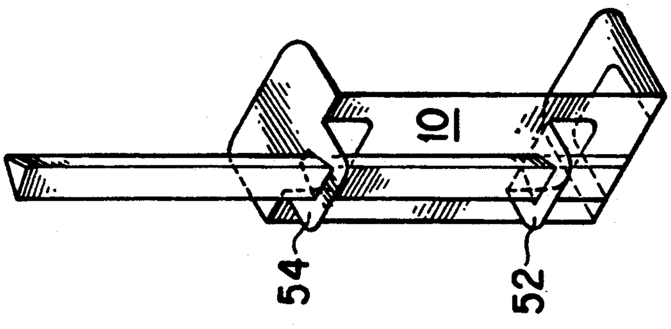
FIG. 5 shows the device assembled with standard and base.

FIGS. 5, 6 and 7 show the standard mounting, the easel support mounting and the frame mounting respectively.

MODIFICATIONS

Specific compositions, methods, or embodiments discussed are intented to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. A promotional display card with substantially planar devices adaptable for alternatively standing on a counter or being supported by a standard or being displayed in a frame, said device comprising in combination:

a. a substantially planar combination easel/standard holder means for optionally inserting into a frame and comprising at least one fold-out easel element adapted to optionally hold said display erect on a countertop and at least one fold-out locking element for locking said easel element at an angle to the face of said display, said locking element also including standard-holding means for optionally supporting said display on standard means, said easel/standard holder being partially affixed in a planar contact on the reverse of said display card;

b. a second standard-holder element adapted as a base for a standard, said standard-holder element comprising at least one standard-holder and at least one attaching means for attaching said second standard-holder element to a container or other means for holding said standard-holder substantially erect so as to act as a base for standard means;

c. standard means adapted for alternately flattening and alternately folding lengthwise so as to stiffen said standard means for engaging said standard-holder means and for holding said display at an elevation above said second standard-holder means.

2. A device according to claim 1, wherein said easel element and said locking means are cut from a common planar element.

3. A device according to claim 2, additionally comprising second standard-holder means also laying in substantially the same plane as said easel means and said locking/standard-holder means, when in the non-erected position, but adapted to fold-out, away from the plane of said display means so as to engage a standard at a point higher or lower than said standard is engaged by said locking/standard-holder means.

4. A device according to claim 1, wherein said easel means and said locking means/standard-holder means are affixed to the reverse of a card bearing said display so that when said easel means and said locking/standard-holding means are in the non-erected position, they lie in substantially in the same plane as said display means.

5. A device according to claim 1, whereby said display means and said easel means and said locking/standard-holding means form a substantially planar combination for easy insertion into an envelope or other transportation container.

6. A device according to claim 1, wherein said standard means is adapted for flattening and then folding lengthwise so as to stiffen said standard for holding said display.

7. A device according to claim 1, still additionally comprising a second standard-holder element, said element comprising at least one standard-holder and at least one attaching means for attaching said second standard-holder element to a container, or other means for acting as a base for holding said standard substantially erect.

8. A device according to claim 7, wherein said additional standard-holder element comprises a plurality of cut-outs for receiving said standard at different elevations along said standard.

9. A device according to claim 8, wherein said additional standard-holder element comprises a plurality of attachment devices for attachment to a fixture or other means for holding said standard erect.

10. A device according to claim 9, wherein at least one of said attachment means comprises a collar adapted for fitting around the neck of a bottle or other retail package.

11. A device according to claim 1, wherein said standard is adapted for wedging or stabbing between the packages of a carton of retail packages so as to maintain said standard in substantially a vertical position.

* * * * *